United States Patent
Lin et al.

(10) Patent No.: US 10,470,011 B2
(45) Date of Patent: *Nov. 5, 2019

(54) ADAPTIVE POSITION DETERMINATION

(71) Applicant: Microsoft Technology Licensing, LLC, Redmond, WA (US)

(72) Inventors: Jyh-Han Lin, Mercer Island, WA (US); Chih-Wei Wang, Redmond, WA (US); Stephen P. DiAcetis, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,363

(22) Filed: Jan. 30, 2018

(65) Prior Publication Data

US 2018/0152820 A1    May 31, 2018

Related U.S. Application Data

(63) Continuation of application No. 14/275,467, filed on May 12, 2014, now Pat. No. 9,918,202.

(51) Int. Cl.
*H04W 4/42* (2018.01)
*H04W 40/24* (2009.01)
(Continued)

(52) U.S. Cl.
CPC ............... *H04W 4/42* (2018.02); *G01S 5/02* (2013.01); *G01S 5/0236* (2013.01);
(Continued)

(58) Field of Classification Search
CPC ........ G01S 5/02; G01S 5/0236; G01S 5/0252; G01S 5/0263; G01S 5/0268; H04W 40/244; H04W 4/043; H04W 64/003
See application file for complete search history.

(56) References Cited

U.S. PATENT DOCUMENTS 7,956,807 B1    6/2011  Celebi et al.
8,279,840 B2   10/2012  Walker, Sr.
(Continued)

FOREIGN PATENT DOCUMENTS

CN    102196557 A    9/2011
CN    102227923 A   10/2011
(Continued)

OTHER PUBLICATIONS

"Office Action Issued in Chinese Patent Application No. 201580025009.0", dated Jun. 5, 2018, 11 pages.
(Continued)

*Primary Examiner* — Kashif Siddiqui

(57) ABSTRACT

A system and method for calculating a position in response to a position request. Observed beacon data associated with the request is used to select a calculation method based on available data for a venue and device capabilities. If sufficient venue data based on previously verified beacon positions is available, a position calculation can resolve floor and venue information. If insufficient previously observed data is available for a venue, the position is calculated using 2D data based on GPS observations. Following the choice a calculation model, the calculation position is returned in response to the position request.

20 Claims, 12 Drawing Sheets

(51) Int. Cl.
  *H04W 64/00* (2009.01)
  *G01S 5/02* (2010.01)
  *H04W 4/33* (2018.01)
  *H04W 4/04* (2009.01)

(52) U.S. Cl.
  CPC .......... *G01S 5/0252* (2013.01); *G01S 5/0263* (2013.01); *G01S 5/0268* (2013.01); *H04W 4/043* (2013.01); *H04W 4/33* (2018.02); *H04W 40/244* (2013.01); *H04W 64/003* (2013.01)

(56) References Cited

U.S. PATENT DOCUMENTS

| | | | |
|---|---|---|---|
| 8,320,939 | B1 | 11/2012 | Vincent |
| 8,369,264 | B2 | 2/2013 | Brachet et al. |
| 9,918,202 | B2* | 3/2018 | Lin .................. G01S 5/02 |
| 2002/0062193 | A1 | 5/2002 | Lin |
| 2006/0052115 | A1 | 3/2006 | Khushu |
| 2009/0189810 | A1 | 7/2009 | Murray |
| 2010/0090899 | A1 | 4/2010 | Zhao et al. |
| 2011/0227791 | A1 | 9/2011 | Lin et al. |
| 2013/0018826 | A1 | 1/2013 | Sundararajan et al. |
| 2013/0023282 | A1 | 1/2013 | Lin et al. |
| 2013/0084887 | A1 | 4/2013 | Akiyama et al. |
| 2013/0109405 | A1 | 5/2013 | Siomina et al. |
| 2013/0162481 | A1 | 6/2013 | Parvizi et al. |
| 2013/0273938 | A1 | 10/2013 | Ng et al. |
| 2013/0342401 | A1 | 12/2013 | Lin et al. |
| 2014/0004876 | A1* | 1/2014 | Fuller .................. G01C 21/206 455/456.1 |
| 2014/0011518 | A1* | 1/2014 | Valaee .................. H04W 64/00 455/456.1 |
| 2014/0040175 | A1 | 2/2014 | Sundararajan et al. |
| 2014/0057651 | A1 | 2/2014 | Lin et al. |
| 2014/0073349 | A1 | 3/2014 | Schunk |
| 2014/0087758 | A1 | 3/2014 | Maor |
| 2014/0192658 | A1* | 7/2014 | Venkatraman .......... G01S 19/14 370/252 |

FOREIGN PATENT DOCUMENTS

| | | |
|---|---|---|
| CN | 103402258 A | 11/2013 |
| RU | 2351945 C1 | 4/2009 |
| RU | 108184 U1 | 9/2011 |
| WO | 2013070170 A1 | 5/2013 |

OTHER PUBLICATIONS

"Office Action Issued in Chile Patent Application No. 2831-2016", dated May 17, 2018, 8 pages.
"Office Action Issued in Mexican Patent Application No. MX/a/2016/014636", dated Mar. 2, 2018, 3 pages.
"Office Action Issued in Colombia Patent Application No. NC2016/0005053", dated May 22, 2018, 17 pages.
"Written Opinion Issued in Singapore Patent Application No. 11201609305T", dated Aug. 31, 2017, 5 Pages.
"Final Office Action Issued in U.S. Appl. No. 14/275,467", dated Jul. 31, 2017, 17 Pages.
"Non Final Office Action Issued in U.S. Appl. No. 14/275,467", dated Oct. 6, 2015, 22 Pages.
"Non Final Office Action Issued in U.S. Appl. No. 14/275,467", dated Jul. 21, 2016, 27 Pages.
"Non Final Office Action Issued in U.S. Appl. No. 14/275,467", dated Mar. 15, 2017, 16 Pages.
"Notice of Allowance Issued in U.S. Appl. No. 14/275,467", dated Oct. 30, 2017, 8 Pages.
"Response to Office Action Issued in European Patent Application No. 15722429.6", dated Jun. 19, 2017, 11 Pages.
"Amendment and Response to Office Action Issued in Chinese Patent Application No. 2015800250090", dated Jun. 23, 2017, 14 Pages.
Celebi, et al., "Adaptive Positioning Systems for Cognitive Radios", In Proceedings of the 2nd IEEE International Symposium on New Frontiers in Dynamic Spectrum Access Networks, Apr. 17, 2007, pp. 78-84.
Chintalapudi, et al., "Indoor Localization Without the Pain", In Proceedings of the Sixteenth Annual International Conference on Mobile Computing and Networking, Sep. 20, 2010, 12 Pages.
Demiroz, et al., "Classification by Voting Feature Intervals", In Proceedings of the 9th European Conference on Machine Learning, Apr. 23, 1997, 8 Pages.
"Office Action Issued in Colombian Patent Application No. NC2016/0005053", dated Dec. 22, 2016, 3 Pages.
"International Search Report & Written Opinion Issued in PCT Application No. PCT/US2015/030167", dated Aug. 5, 2015, 12 Pages.
"International Preliminary Report on Patentability Issued in PCT Application No. PCT/US2015/30167", dated Apr. 29, 2016, 6 Pages.
Reyero, et al., "A Pervasive Indoor-Outdoor Positioning System", In the Journal of Networks, vol. 3, Issue 8, Nov. 2008, pp. 70-83.
Sharp, et al., "Positional Accuracy Measurement and Error Modeling for Mobile Tracking", In Proceedings of IEEE Transactions on Mobile Computing, vol. 11, Issue 6, Jun. 2012, pp. 1021-1032.
Yang, et al., "On the Performance of Wireless Indoor Localization Using Received Signal Strength", In Handbook of Position Location: Theory, Practice, and Advances, Chapter 12, Sep. 6, 2011, 31 Pages.
"Office Action Issued in Chile Patent Application No. 2831-2016", dated Feb. 16, 2018, 5 Pages.
"Notice of Allowance Issued in Singapore Patent Application No. 11201609305T", dated Jan. 16, 2018, 6 Pages.
"Notice of Allowance Issued in South Africa Patent Application No. 2016/06706", dated Feb. 23, 2018, 1 Page.
"Notice of Allowance Issued in European Patent Application No. 15722429.6", dated Feb. 26, 2018, 7 Pages.
"First office Action Issued in Australian Patent Application No. 2015259420", dated Sep. 5, 2018, 2 Pages.
"Office Action Issued in Japanese Patent Application No. 2016-567632", dated Mar. 19, 2019, 9 Pages.
"Second Office Action Issued in Chinese Patent Application No. 201580025009.0", dated Jan. 31, 2019, 11 Pages.
"Office Action Issued in Philippines Patent Application No. 1/2016/502026" dated Feb. 14, 2019, 5 Pages.
"Office Action and Search Report Issued in Russian Patent Application No. 2016144263", dated Dec. 13, 2018, 8 Pages. (W/O English Translation).

* cited by examiner

Figure 8

| Bssid | Indoor La | Indoor Lo | Power | Gamma | VenueId | FloorId |
|---|---|---|---|---|---|---|

Figure 9

Hybrid Venue AP Model

| Bssid | Indoor Refined La | Indoor Refined Lo | Power | Gamma | VenueId | FloorId | Refined La | Refined Lo | Refined Radius |
|---|---|---|---|---|---|---|---|---|---|

| Bssid | La | Lo | Power | Gamma | VenueId Offset + Size | FloorId Offset + Size | Refined La | Refined Lo | Refined Radius |
|---|---|---|---|---|---|---|---|---|---|
| 00:03:52:AE:AC:B0 | 47.671943591 79093 | 122.121584461 024856 | 53.444793839 34 007 | 2.41101260 24889684 | (0 + 23) | (0 + 7) | 45.671943591790 93 | 121.121584461024 856 | 100 |

| Bssid | Venue Id | Floor Name | Interval Start | Interval End | Weight |
|---|---|---|---|---|---|
| 00:02:6F:3E:13:9A | bingmapsteam-thebravern | Level 2 | -92 | -79 | 1 |
| 00:02:6F:47:83:81 | hci-crossroads | Level 1 | -94 | -90 | 1 |
| 00:02:6F:89:A6:89 | hci-commonsatfederalway | Level 1 | -98 | -74 | 1 |
| 00:02:6F:C6:2F:2D | hci-northgatemall | Level 1 | -95 | -89 | 1 |
| 00:03:2F:31:7E:4C | nokia-alderwoodmall | Level 1 | -98 | -67 | 1 |
| 00:03:52:76:A8:90 | bingmapsteam-thebravern | Level 2 | -96 | -94 | 1 |
| 00:03:52:76:A8:90 | bingmapsteam-thebravern | Level 2 | -94 | -93 | 0.5714285714285714 |
| 00:03:52:76:A8:90 | bingmapsteam-thebravern | Level 3 | -94 | -93 | 0.4285714285714354 |
| 00:03:52:76:A8:90 | bingmapsteam-thebravern | Level 2 | -93 | -89 | 1 |
| 00:03:52:98:66:80 | bingmapsteam-thebravern | Level 2 | -96 | -94 | 1 |
| 00:03:52:98:66:80 | bingmapsteam-thebravern | Level 2 | -94 | -91 | 0.8571428571428571 |
| 00:03:52:98:66:80 | bingmapsteam-thebravern | Level 3 | -94 | -91 | 0.1428571428571425 |
| 00:03:52:98:66:80 | bingmapsteam-thebravern | Level 3 | -91 | -90 | 1 |

Figure 10

```xml
<GetLocationUsingFingerprintResult>
  <ResponseStatus>Success</ResponseStatus>
  <LocationResult>
    <ResolverStatus Status="Success" Source="Internal" />
    <ResolvedPosition Latitude="47.615696" Longitude="-122.204321" Altitude="" />
    <ResolvedLocation>
      <Property Name="VenueId" Value="bingmapsteam-bellevuesquare" />
      <Property Name="FloorId" Value="Level 1" />
    </ResolvedLocation>
    <RadialUncertainty>17m</RadialUncertainty>
    <TileResult />
    <TrackingId>329b074c-83d6-4e82-841f-359bb269d59d</TrackingId>
  </LocationResult>
  <ExtendedV21Result CrowdSourcingLevel="Medium" ServerUtcTime="2011-05-03T06:25:28.8583604Z" />
</GetLocationUsingFingerprintResult>
```

Figure 11

ADAPTIVE POSITION DETERMINATION

CROSS REFERENCE TO RELATED APPLICATIONS

This application is a continuation of and claims priority to U.S. application Ser. No. 14/275,467, entitled "ADAPTIVE POSITION DETERMINATION," filed May 12, 2014, which is incorporated by reference herein in its entirety.

BACKGROUND

Location estimation is used by mobile processing devices to establish the device position and is a feature which is useful to a number of applications on the device. Location estimation techniques may use any of a number of different methods to calculate a position. While satellite systems such as Global Navigation Satellite System (GNSS) may aid in determining positions, use of Wi-Fi beacons in calculation techniques may provide a more accurate position fix and/or provide position fixes in areas where satellite systems are not accessible. The position of a mobile computing device can be estimated by using the strength of the radio signal from a beacon. However, the unpredictability of signal propagation through indoor environments is a challenge in determining a position fix. It can be difficult to provide an adequate statistical model of signal strength measurements. Some efforts have focused on techniques that can generate an accurate empirical model from training data collected in a test area and real-time estimation for mobile processing devices. The accuracy of such approaches is at least in part dependent on the number of positions that are known to the positioning algorithm. The possible signal fluctuations that may occur, however, can increase errors and inaccuracies in the path of the user. Depending on the position of a device, one calculation method may be superior to others in providing position accuracy.

SUMMARY

Technology is provided for calculating a position in response to a position request. The position request can include observed beacon data associated with the request and upon which the calculation should in part be based. In response to the position calculation request, a selection is made between positioning algorithms and potentially differing data sources and models. Choice of the data models and algorithms depends on a number of factors, including the capabilities of the device performing the processing, the number of observed beacons and the availability of data to resolve a position at a venue This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a table illustrating a first AP model FIG. 9 is a table illustrating a hybrid AP model.

FIG. 10 is a table illustrating voting features interval data.

FIG. 11 is Extensible Markup Language (XML) data provided in response to a position request.

DETAILED DESCRIPTION

Figure 1:
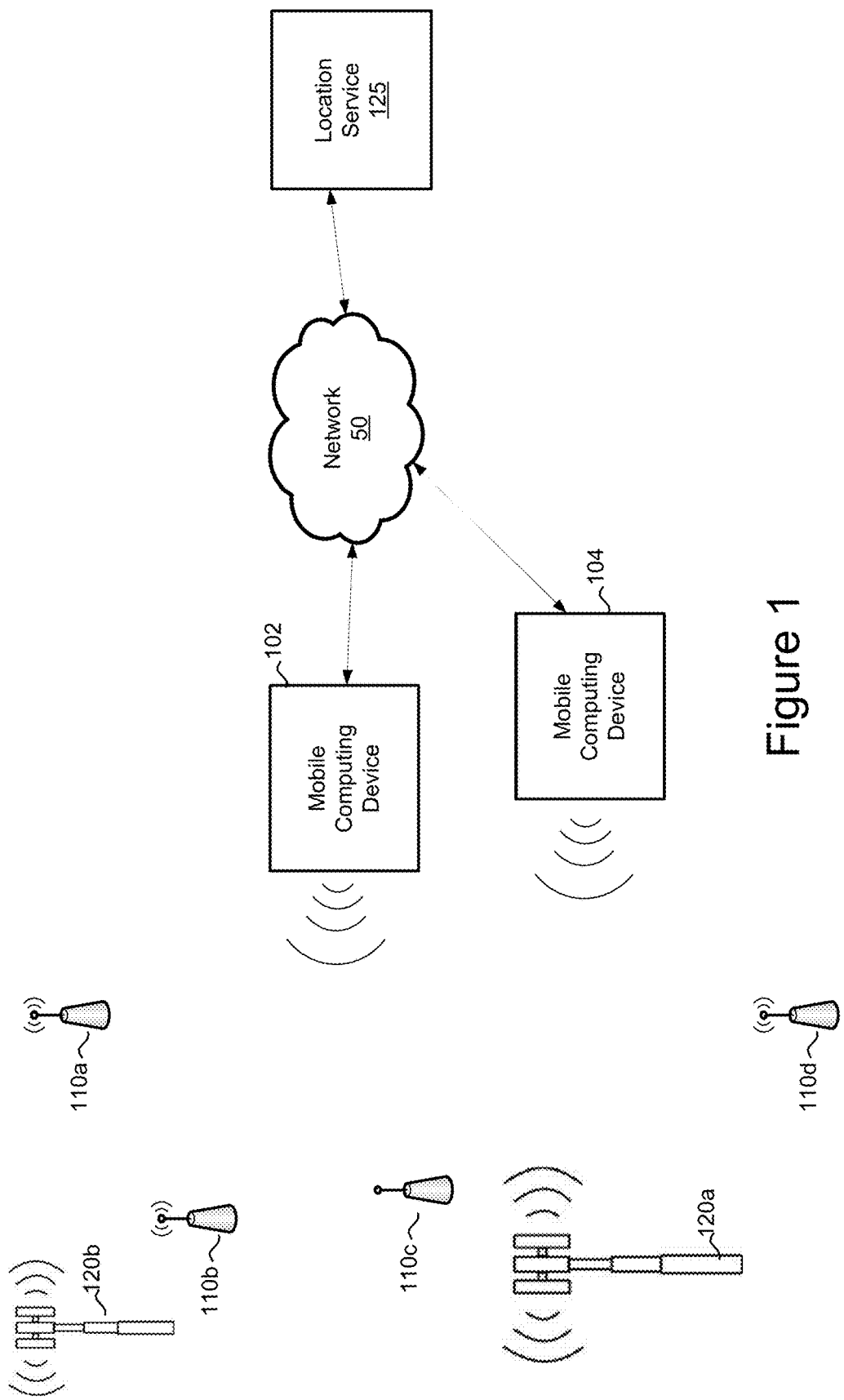
FIG. 1 is a block diagram depicting mobile computing devices relative to wireless beacons utilized for position calculations.

Technology is provided for determining or calculating a position in response to a position request. The position request can include observed beacon data associated with the request and upon which the calculation should in part be based. In response to the position calculation request, a selection is made between alternative positioning algorithms and potentially differing data sources and models. By providing a number of different algorithms, an optimal method of calculating a position based on observed data in the position request occurs.

In accordance with the technology, a position calculation system uses one of at least two algorithms and two data models to calculate a position based on which algorithm provides a more accurate position calculation. Choice of the data models and algorithms depends on a number of factors, including the capabilities of the device performing the processing, the number of observed beacons and the availability of data to resolve a position at a venue. In the disclosure herein, the beacons used may be wireless fidelity (Wi-Fi) access points having one or more basic service set identifiers (BSSIDs). (It should be noted that one physical access point may be configured to support multiple BSSIDs.)

A first type of algorithm uses data consisting of Wi-Fi access point fingerprints and GPS position fixes based on a two dimensional (2D) access point model. The two dimensional model includes a longitude and latitude of various access points having known positions. A 2D data store of the access point positions is maintained with positions of all Wi-Fi access points in the model provided at the approximate center of all observed locations. Thus, the position associated with an access point comprises a most statistically likely position of a detected access point, rather than where the access point may be actually located. Using beacon detections, multiple measurements are combined during a position calculation in response to a position request to compute position and error radius. This method is alternatively referred to herein as creating an "inferred" position. This first method is less sensitive to characteristics of the RF environment, as the RF environment affects only whether a beacon can be observed, and is effective when beacon density is low. The first method works well in higher density environments with predictable RF characteristics, however a second positioning algorithm described below provides statistically better positioning results in such higher density environments.

A second positioning algorithm uses three dimensional Wi-Fi fingerprints based on beacon observations consisting of Wi-Fi fingerprints, venue, floor, and user supplied ground truth relative to a known position. A 3D data store is provided in which an access point model having latitude, longitude, venue, and venue floor characteristics may be provided. The model positions Wi-Fi access points where the access points are believed to be located, using signal strength to range the position. To calculate a position, the positioning algorithm positions device using trilateration, using signal strength to determine distance from published access points in the 3D store. A device's receiver gain is automatically determined, and four observed Wi-Fi access points are used to calculate a position. A signal strength distribution based floor detection model is used to determine a floor from the Wi-Fi fingerprint. This calculation system is advantageous when the RF environment is more predictable (i.e., follows propagation path loss curve approximately) and when beacon density is high.

In the context of this disclosure, a calculated position may include a latitude, longitude and other logical location information such as a venue identifier and a floor identifier within the venue.

FIG. 1 illustrates an exemplary context in which the technology described herein may be utilized. FIG. 1 illustrates a block diagram of a plurality of mobile computing devices 102, 104 which utilize one or more beacons 110a-110d or other cell sites 120a, 120b to calculate a position for the mobile device. The mobile computing devices 102, 104 observe or otherwise detect one or more of the beacons 110, 120 and utilize the signals from these beacons to compute a position. Exemplary beacons include cellular towers, base stations, base transceiver stations, base station sites, and/or any other network elements supporting any quantity and type of vacation mode. Typically, beacons 110a-110d represent Wi-Fi beacons which have known propagation properties and signals which provide information to allow, for example, the mobile devices to calculate positions in areas where other types of signals may not be present, such as the interior of buildings and the like. Each of the mobile computing devices 102, 104, may store properties for each beacon 110, 120. In some embodiments, exemplary properties include a latitude and longitude of the observing mobile computing device and an observation time. In internal positions such as a venue, the observations may include more granular information, such as a floor position.

Each mobile computing device may itself perform a position calculation, or may provide information to a location service 125 via a network 50 with the location service 125 returning a calculated position of the device to the device. Each position calculation may utilize a Kalman filter (or other methods) to a beacon fingerprint (e.g., set of beacons observed by the computing device) to produce an inferred device position. An error radius may also be calculated. The error radius may be reflected as a circle having the estimated device error radius as its radius. As a result, if a particular beacon is detected with a given confidence level, an inferred device position may be produced that is within a circle centered at the estimated beacon position with the estimated beacon radius as illustrated at 418 of FIG. 12.

The location service 125 which may perform a position calculation based on the observations of mobile computing device (102, 104), pervious position surveys, and other data which is gathered and stored at the location service 125. In some embodiments, location service 125 may collect data from numerous different mobile computing devices as well as observations of beacons relative to known actual positions, referred to herein as ground truth. Mobile computing devices 102, 104 may send the properties of observed positions and of the beacons observed at the various positions to the location service via network 50. Location service 125 may operate one or more computing devices as illustrated herein to provide position determination services to the mobile processing devices via network 50.

A calculated or inferred position may include both position and have an associated error radius. The error radius is a reflection of the uncertainty or error which may be present in the calculation of the position. An illustration of an error radius as displayed by a mapping application using a calculated position is set forth in FIG. 12. Generally the error radius represents an area surrounding the calculated position which indicates to the user of the calculated position the relative accuracy of the calculation.

The observations may be used in conjunction with GPS services to determine a position. In some instances, GPS data is not available. When a mobile computing device is present in an interior of a building venue, access to GPS data is generally difficult to receive. Hence, the use of Wi-Fi or other information may yield more accurate inferred position data.

Figure 2:
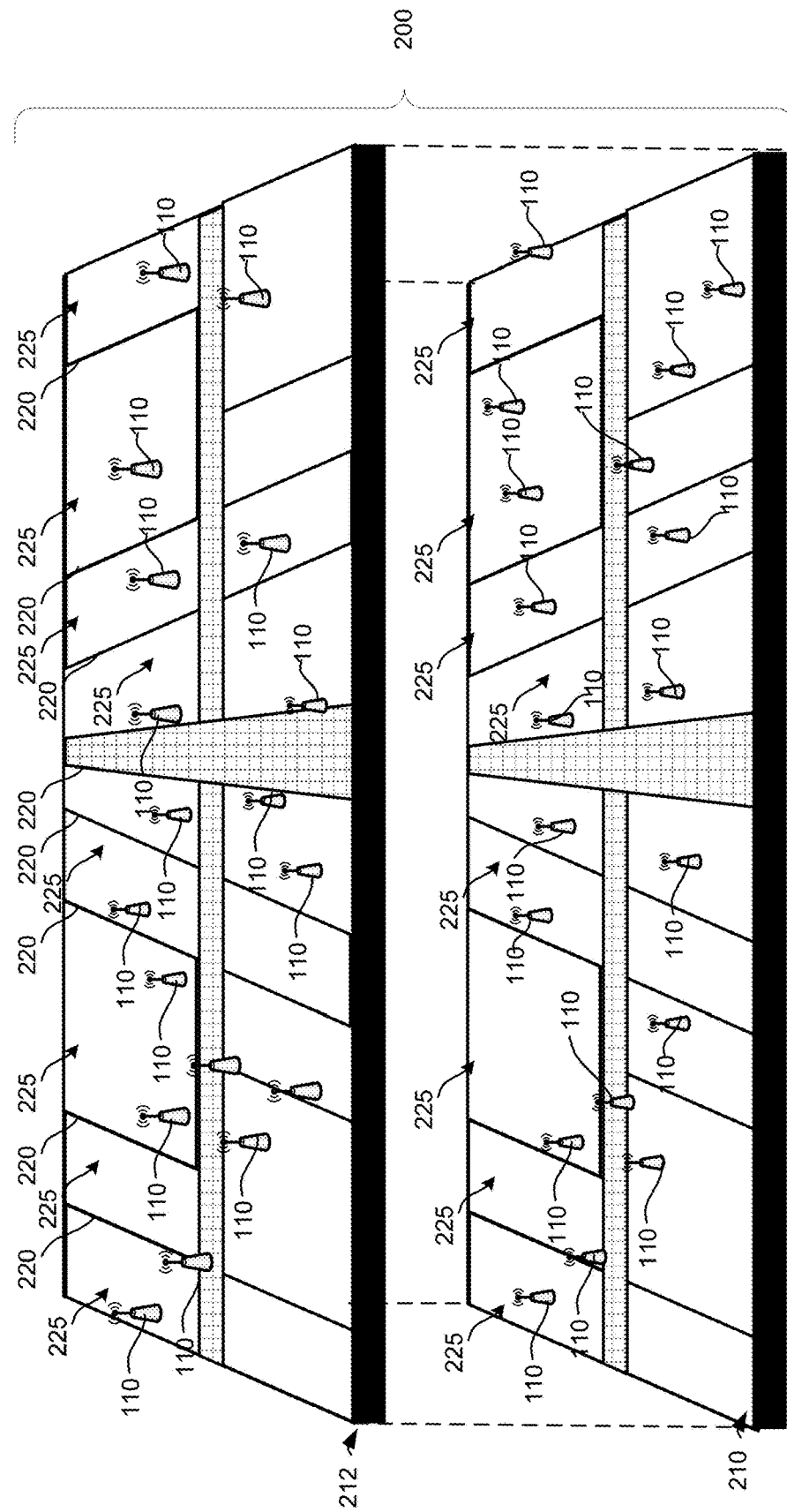
FIG. 2 is a perspective exploded view of an indoor position with a plurality of wireless beacons.

FIG. 2 illustrates an exploded, perspective view of a venue 200 having a plurality of Wi-Fi beacons positioned about the interior of the structure. Venue 200 may be, for example, a shopping mall, school, office building, airport or other building where access to GPS data is not readily available. FIG. 2 illustrates a first floor 210 and second floor to 212 of the venue 200. A plurality of walls 220 separate various rooms 225 within the venue 200. Beacons 110 are positioned throughout both floors of the venue 200. A processing device may use the properties of the beacons within the venue 200 to calculate the position of the processing device. Generally, calculated positions are returned to applications which utilize the calculated position to provide information to user. Although there are a number of different types of location applications, a mapping application is a typical use a calculated position.

Local positioning may be performed utilizing many different properties. Some methods use physical properties of the signal, while others use the time taken for the signal to reach the destination node. Some common positioning methods include angle of arrival, cell identity, time of arrival, time difference of arrival and power based wireless positioning methods. One common approach employs surveying of signal strength information in a particular area. This information forms a database describing the signal strength finger print of that area. The database is later used to determine the position of a mobile device by a particular pattern matching algorithm. Another power based wireless positioning approach uses a path-loss model to estimate the relationship between the signal strength and distance from transmitters. The estimated distances from three or more transmitters are used to trilaterate the final position of the device. Although particular methods and algorithms of positioning are described herein, the present technology may incorporate any of a number of different position calculation methods in conjunction with the teachings of the technology.

Figure 3:
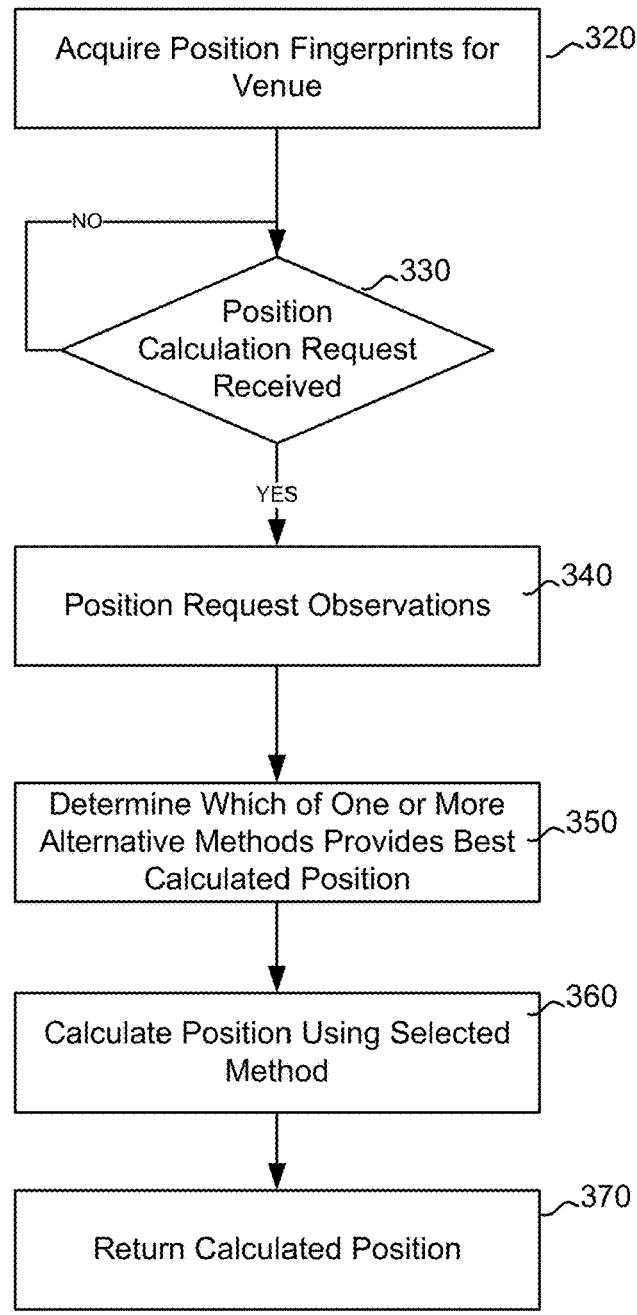
FIG. 3 is a flowchart representing a method in accordance with the present technology to determine a position using a selected method.

FIG. 3 is a flowchart illustrating a method in accordance with the present technology to determine a calculated position. In one context, the position is calculated in response to a position request. The position request may be generated, for example, by a mobile processing device seeking to determine a calculated position for one or more location aware applications on the mobile processing device. The method may be performed in whole or in part on a mobile processing device alone, or in communication and cooperation with a location service 125.

At step 320, venue beacon information is acquired for one or more venues. A venue may be a location with physical facilities, such as a building, or any location where one or more beacons of "access points" (AP) are located. The venue information may result from a position survey during which information is gathered comprising beacon fingerprints of positions of beacons which are detected at the venue. Beacons may be detected by a mobile computing device 102, 104 at a given point in time represent position observations and include a beacon fingerprint. The beacon fingerprint may also include other attributes of the detection such as signal strength, and the date and time of observation. One mechanism for gathering site information is disclosed in U.S. Patent Application Serial No. US20140057651A1.

Generally, position survey information may be gathered by physically surveying a site using a mobile processing device, determining a beacon fingerprint for the location and establishing a set of ground truth data of actual positions associated with beacon fingerprints for the venue. To establish ground truth for a particular venue, observed data for a venue is associated with known positions for the observed data. The observed data may be associated by means of a survey using known position information (in terms of known latitude, longitude, and floor positions) which is mapped to a beacon fingerprint at a given time. Fingerprints of the known beacons at each of a set of map positions is created. A correlation between the inferred positions is used assess the accuracy of the position determination by comparing the inferred position with ground truth.

At 330, and at a time which may be coincident with or after acquisition of location fingerprints at step 320, a request to determine a position may be received. The request may be received from, for example, a location aware application on a mobile processing device. The request may be received by a calculation on the mobile processing device or transmitted from the mobile device and received by the location service 125. Numerous such location applications on a mobile processing device may use calculated positions to provide information and services to users of the mobile processing device. Once the position determination request is received at 330, a determination of beacons observed by the mobile positioning device initiating the request is made at 340. The observable beacons are used in calculating the position of the device relative to the position fingerprints. In one embodiment, the request at 330 may include a set of observed beacons at 340 as part of the request.

At 350 a determination is made as to which of one or more alternative position calculation methods will provide the most accurate position calculation based on a number of factors. The determination of the method used for calculating a position is described below with respect to FIG. 4.

At 360, the selected method is used to calculate a position, and the calculated position is returned in response to the request at 370.

Figure 4:
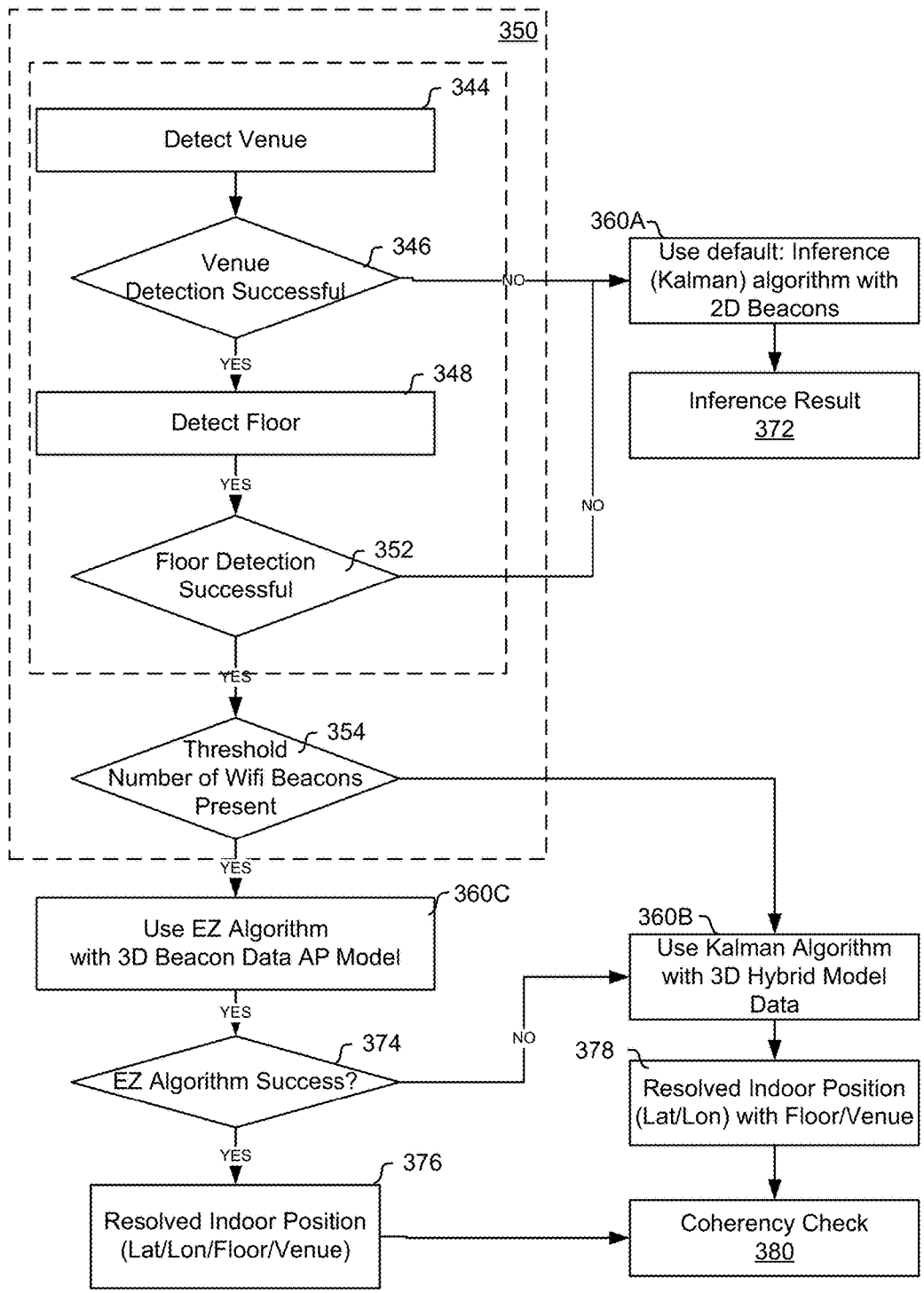
FIG. 4 is a flowchart illustrating a step of selecting a most accurate calculation method

FIG. 4 is a flow chart illustrating one method of determining which of a plurality of alternative methods provides the best position calculation at step 350 in FIG. 3. In one embodiment, two potential calculation methods may be utilized. However, it will be understood that the number of different types of calculation methods need not be limited. Further, the present technology is applicable to indoor positioning calculations and hence the presence of a sufficient number of venue beacons for a particular method of calculation may be needed.

Initially, it should be noted that a default method using an inference algorithm based on a Kalman algorithm with a 2D beacon model data is shown at 360A. The default method of 306A is used to determine a calculated position if other, more robust position methods are not capable of use as described herein. The inferred position result from this algorithm is provided at 372. Although in one aspect, a Kalman algorithm is used at 360A, other methods for calculating a position may be used as a default method in accordance with the technology.

At 344, an attempt is made to determine a venue where the device is located. The venue may be determined, for example, based on a threshold of at least two detected and venue-identified beacons being present in observations made by the device at 340 above. In one embodiment, the venue is verified if two beacons having a minimum detected threshold signal strength are present in the observations 340. If venue detection is unsuccessful at 346, then the method returns to the default calculation method at 360A.

If venue detection is successful at 346, then an attempt is made to detect the floor within the venue at 348. In one embodiment, floor detection may be determined by a voting process as discussed below with respect to FIG. 6

If floor detection is unsuccessful, then the method returns to the default calculation method at 360A.

In another alternative, venue and floor detection 355 may be accomplished using floor detection steps 348 and 352. In this alternative, detection of a floor may include data identifying the venue where the floor is located, such that detection of the beacon fingerprint of a given floor inherently yields the venue where the floor is located.

If floor detection is successful at 352, then one of an inference algorithm using a 3D venue-based hybrid access point (AP) model (at 360B) or an algorithm based on an "EZ" positioning algorithm using a 3D venue AP model (at 360C) may be used to determine a calculated position. An EZ algorithm is detailed in K. Chintalapudi and V. Padmanabhan, "Indoor Localization Without the Pain," MOBICOM, Association for Computing Machinery, Inc., September 2010 (http://research.microsoft.com/pubs/135721/ez-mobicom.pdf).

If floor detection is successful at 352, initially an attempt to calculate a position using an EZ algorithm at 360C is performed. If the calculation is successful at 374, the calculated position is resolved at 376. If the calculation is not successful, an inference algorithm using a hybrid AP model incorporating floor and venue data is used to calculate a position at 360B. At 378, a calculated position is returned.

At 380 a coherency and privacy check may be performed on the calculated results. The coherency and privacy check determines whether the result agrees with a minimum data standard specified. For example, if only one Wi-Fi beacon is found in observed data and no 2D data was available for the beacon, a coherency check would ensure that no position result be provided due to privacy concerns.

Figure 7:
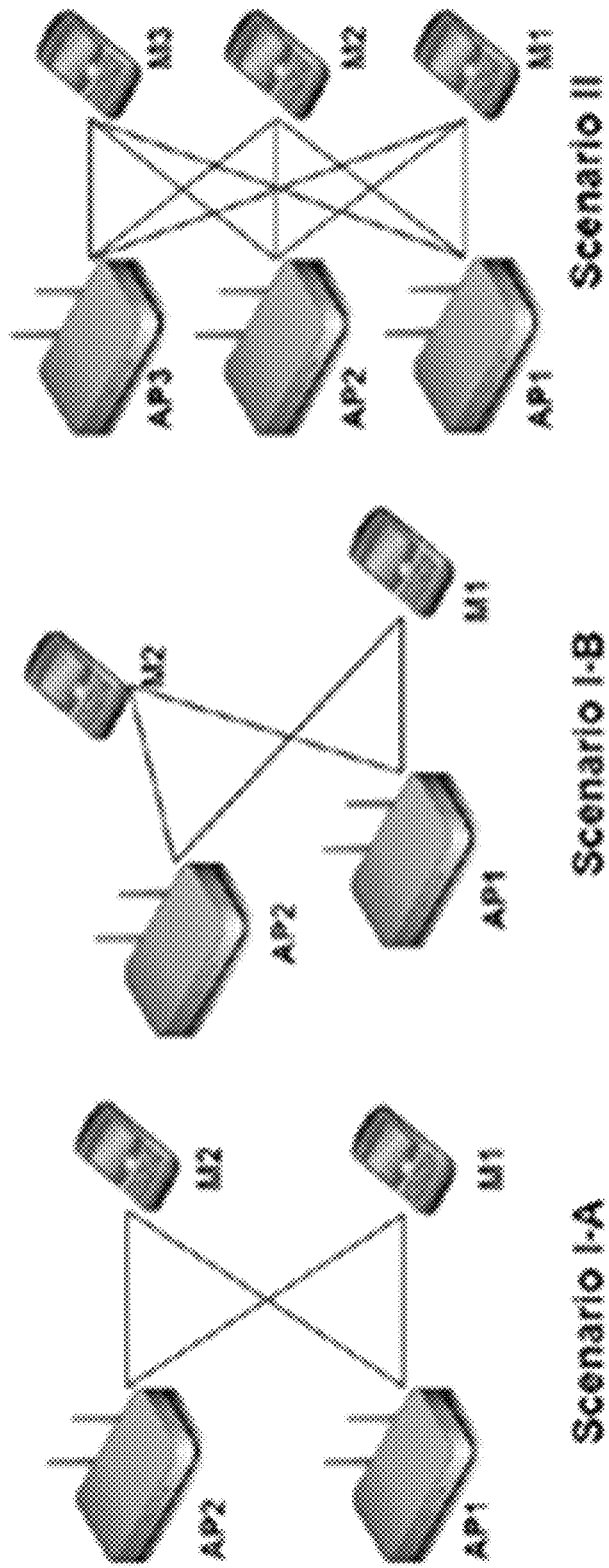
FIG. 7 is a block diagram illustrating scenarios calculating position using an EZ algorithm

In general, an EZ algorithm uses an assumption that all the observations reported from an initial survey and those used in a position calculation are constrained by the underlying physics of RF propagation. The EZ algorithm models these constraints and then uses them to determine the AP model and the unknown positions simultaneously. Referring to FIG. 7, assume that there are two users (M1, M2) and two APs (AP1, AP2) and one knows all the four AP-user distances (as shown scenario I-A in FIG. 7). Based on this information, several different quadrilaterals can be constructed, with positions of the APs and users as the vertices as depicted in Scenarios I-A and I-B. The realization of the relative positions (modulo translation, rotation, and reflection) of the APs and users is not unique. However, it can be proved that if there were three APs and three mobile users, there can only be a unique realization for the relative positions of the APs and the users (Scenario II). This demonstrates that given enough distance constraints between APs and mobile users, one can uniquely determine their positions in a relative sense.

In practice, distances between APs and mobile users can be inferred through received signal strength (RSS). A popular model that relates distance to RSS is given by:

$$p_{ij} = P_i - 10\gamma_i \log(\sqrt{(c_i-x_j)^T(c_i-x_j)}) + G_j$$

In the above equation, $p_{ij}$ is the received RSS at the $j^{th}$ mobile user from the $i^{th}$ AP, $P_i$ is the transmit power of the $i^{th}$ AP, $c_i$ is the position of the $i^{th}$ AP, $x_j$ is the position of the $j^{th}$ mobile user, $\gamma_i$ is the path loss exponent in the vicinity of the $i^{th}$ AP, and $G_j$ is the gain of the $j^{th}$ mobile receiver.

For each RSS observation, one equation in the form of the above is obtained. Since a large number of observations can be collected from different locations (some known locations but mostly unknown locations) for each mobile processing device as it moves, eventually enough equations (i.e., constraints) are provided to solve for all the variables.

Because solving such equations is non-trivial, and a specialized genetic algorithm is developed to solve them. By using a hybrid method with genetic algorithm and gradient descent, finding the solution becomes an optimization problem:

$$\min J = \Sigma |p_{ij} - P_i + 10\gamma_i \log \sqrt{(c_i-x_j)^T(c_i-x_j)}|$$

The above problem has no known analytical solutions and has a large number of local minima. To solve the above, a constraint on the 2D search space is used to resolve the position using EZ algorithm. A bounding box of the venue may be used as the constraint. Commercial mapping systems such as BING® Maps provide venue metadata which can be incorporated as the constraint. The bounding box is a set of two positions that specify the lower left and upper right of the rectangle that covers the area of the venue.

Figure 5:
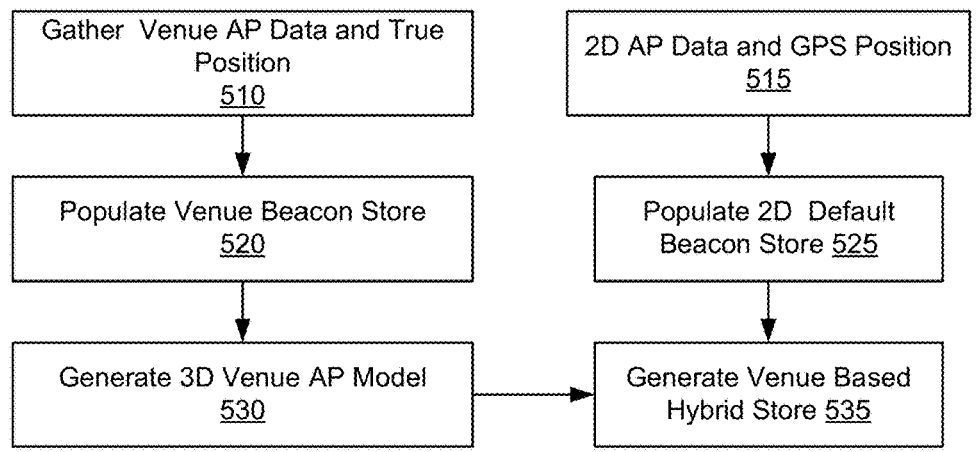
FIG. 5 is a flowchart illustrating creation of data models for the method of FIG. 3.

FIG. 5 illustrates a method for gathering and building a 2D and 3D beacon store in accordance with the present technology. In one embodiment, FIG. 5 represents a method for performing step 320 in FIG. 3. At 510, venue beacon information is gathered using any of a number of known techniques. The location service 125 may collect and maintain the various beacon stores described herein and may provide all or a portion of the models created and described herein to a mobile computing device. In some embodiments, location service 125 may collect data from numerous different mobile computing devices as well as scheduled observations of beacons relative to known actual positions, referred to herein as ground truth. Mobile computing devices 102, 104 may transmit observations to location service 125 via network 50.

At 520, the venue beacon store may be populated using the beacon observations relative to ground truth positions. Generally, venue survey information may be gathered by physically surveying a site using a mobile processing device, determining a beacon fingerprint for the location and establishing a set of ground truth data of actual positions associated with beacon fingerprints for the venue. To establish ground truth for a particular beacon, observed data for a beacon is associated with known positions for the observed data. The observed data may be associated by means of a survey using known position information (in terms of known latitude, longitude, and floor positions) which is mapped to a beacon fingerprint at a given time. Fingerprints of the known beacons at each of a set of map positions is created. A correlation between the inferred positions is used to assess the accuracy of the position determination.

At 530, a venue AP model is created based on the Venue AP data gathered at 510.

2D (latitude and longitude) observations for APs may likewise be present in a data store at 515 for a number of venues. 2D observations 515 may include observations of APs with reference to position data but without floor observations, and may or may not be associated with venues based on the accuracy of the position data associated with the APs. Where AP measurements can be correlated to positions, a 2D model can be generated at 525.

For both the EZ algorithm at 360C and an inference (internal Kalman) algorithm at 360B, a 3D venue access point model is used. In one embodiment, the 3D venue access point model may be generated by a mobile processing device or a location service 125 of FIG. 1. As illustrated in FIG. 8, the 3D venue AP model is a table of data consisting of the columns: BSSID (Base Service Set ID), Latitude, Longitude, Power, Gamma, VenueId, and FloorId.

As noted above, if a threshold number of beacons are present, an attempt will be made to use an EZ algorithm calculation at 360C using the 3D AP model. If the EZ algorithm fails to infer a position (at 374), the system will fall back to using an inference algorithm at 360B to infer the position. For this purpose, the venue-based 3D beacon store is used as part of the AP model.

In accordance with the technology, a venue-based 3D beacon store is generated at 535. This generation may be performed by the location service 125. An example of the hybrid model is shown in FIG. 9. To accomplish, the hybrid venue-based AP model is generated using the EZ model on the indoor observations using the same training data used to generate indoor AP model (FIG. 8) and the 3D beacon store for the venue. This information is joined with the venue AP model generated by an indoor refining technique to create a hybrid indoor model. The EZ algorithm is used to find the position (latitude, longitude), power, and path loss exponent (gamma) of the AP's inside of the venue. For a fingerprint, each beacon with the received signal strength can be written as an equation with the position (latitude, longitude) as unknowns. To solve the position (latitude, longitude), at least three (3) beacons are used for trilatration. However, for various devices, the receiver gain, which affects the received signal strength, is also unknown. This adds another dimension to the solution and thus at least one more beacon in the fingerprint is used to solve the equations. Therefore, in one embodiment, a minimum number of beacons in a fingerprint to resolve its position is four beacons. To build this hybrid model, solutions of the unknown quantities of the AP's based on the observations (each observation being an equation with these unknowns). The method to find the solution is the gradient descent algorithm, which tries to find the solution by searching different combinations of unknowns to the equations to minimize the error. This generation EZ algorithm is a counterpart to the positioning algorithm used at 360C for calculating a position, and is based on the same principle.

Figure 6:
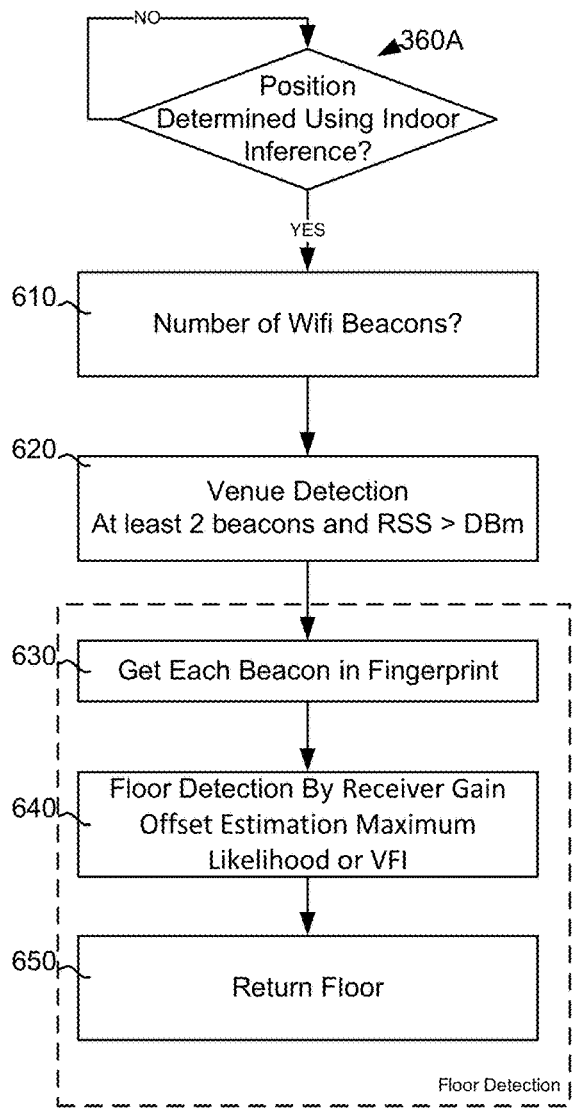
FIG. 6 is a flowchart illustrating selection of a floor based on a voting features interval.

FIG. 6 illustrates a method of performing step 360C. At 610, an initial determination is made to ensure that at least two beacons are present At 620, a determination of the venues determination can be made is two beacons associated with the venue are found in the observed data (340) from the position request.

At 630, each beacon in an observation fingerprint is retrieved, and floor detection is determined by a floor detection process at 640. The floor may be determined, for example, via a voting algorithm or a maximum likelihood algorithm.

In the maximum likelihood algorithm, a statistical probability calculation is made which uses a receiver gain offset estimation maximum likelihood method to select the floor and receiver gain that maximizes the probability that a given floor "generates" the Wi-Fi fingerprint. To select the floor, the method solves for the maximum probability according to:

$$\underset{R}{\operatorname{argmax}}\,\underset{i}{\max}\prod_{j} [\![Prob(\,[\![AP_{ij} = rssi_j + R \mid floor_i)$$

Where:
R is the Receiver gain offset;
floor_i is the ith floor;
AP_ij is the received power from AP_j in floor_i (where AP is the "access point"); and
rssi_j is the received power from AP_j in the fingerprint In the voting model, each beacon in the Wi-Fi fingerprint from the incoming request has a vote for every floor in the indoor beacon store (across all the venues) and the floor with the most votes wins. The winning floor also verifies the venue. If none of the floors receives a vote, then the floor cannot be determined and the venue is not verified. Thus, floor/venue information cannot be provided in the response. The voting model is based on a Voting Feature Intervals (VFI) model such as that described in G. Demiröz and H. Güvenir, "Classification by Voting Feature Intervals," Proceedings of the 9th European Conference on Machine Learning, pp. 85-92, 1997 The VFI model is a table containing the following information for the beacons in the venue: Bssid, VenueId, FloorId, IntervalStart, IntervalEnd, and Weight. A partial VFI model is shown in FIG. 10. Each entry in the table represents a beacon's (Bssid), vote (Weight) (between 0 and 1) for the FloorId and VenueId if the RSS of the beacon in the fingerprint falls within an interval specified by IntervalStart and IntervalEnd. A beacon could have multiple non-overlapping intervals on the same floor, or have intervals for different floors. Therefore, there could be multiple entries in the table for the same beacon.

At 650, the floor determined by either of the above methods is returned.

In one embodiment, the location service 125 may provide position information in response to a position request from a mobile device. In such cases, the returned data may be represented in Extensible Markup Language (XML) provided in response to a "get location using fingerprint" (GLUF) request when floor and venue are resolved. An example of the XML provided in response to this request is illustrated in FIG. 11. The item <ResolvedLocation> is an XmlElement in <LocationResult> and is a property carrier. It represents a logical position to which more detailed items of the venue can be added. For example, "store," "isle," "gate," etc. detail items can be added. <ResolvedLocation> will not be populated if there is no indoor result. It is also possible to return only a venue (VENUEID) without a floor result and only the VenueId property will be populated in <ResolvedLocation>. The enhanced GLUF response is backward compatible, with only one additional XML node that contains logical position entities such as VenueId and FloorId.

Figure 12:
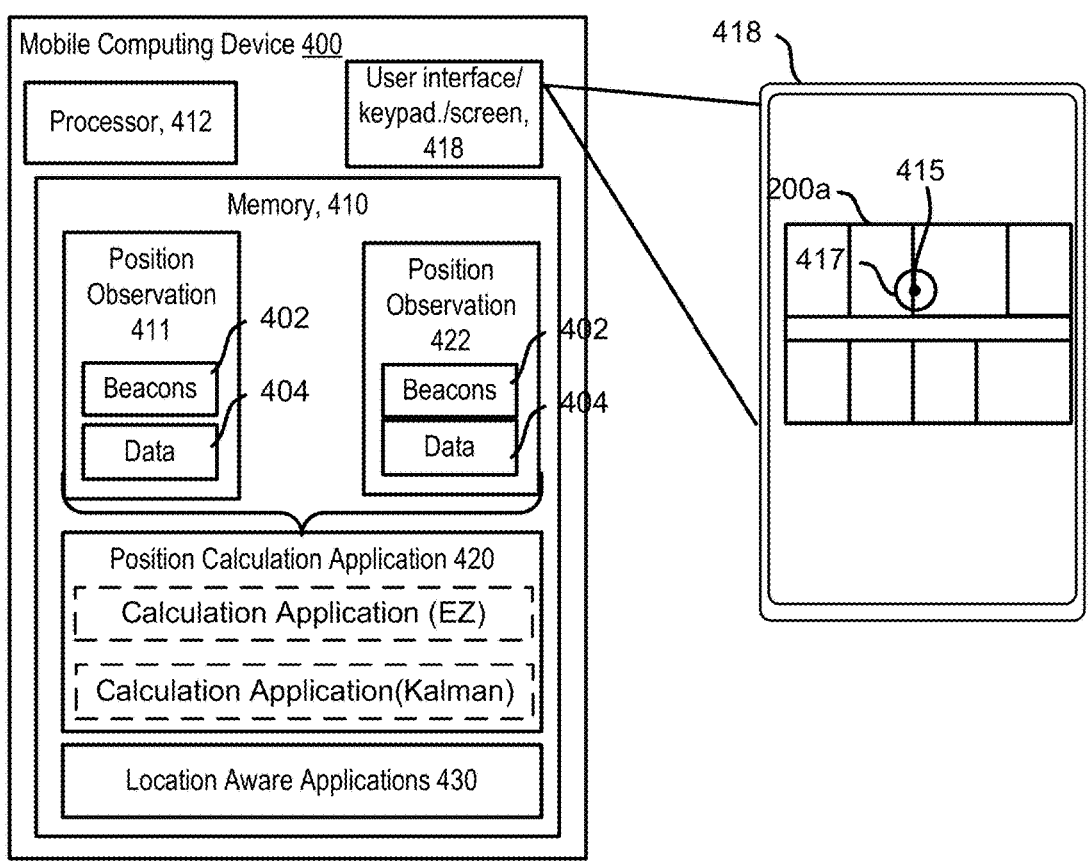
FIG. 12 block diagram of a functional representation of a first processing device and a computing device.

FIG. 12 illustrates a block diagram of a mobile computing device 400 which may comprise one of the mobile computing device 102, 104 of FIG. 1, and may include elements of a mobile device such that illustrated in FIG. 10, below. Computing device 400 may include, for example, a processor 412 and a user interface 418. An exploded view of a display of a user interface 418 illustrates a plan view of a map 200a of a venue, such as venue 200, with an indication 415 of an inferred position displayed on the map along with an error radius 417 surrounding the indication 415 of the inferred position.

Device 400 includes memory 410 which may store plurality of position observations 411, 422. Although only two position observations 411 and 422 are indicated, it will be understood that a number of position observations will be present in memory 410. Each position observation includes a fingerprint of beacons 402 and associated beacon data 404. The position observations may be utilized by a position calculation application 420. The position calculation application 420 may be utilized to calculate a position from the position observations 411, 422. Location aware applications 430 utilize the inferred position calculated by the position of calculation application for any of a number of purposes. In one embodiment (illustrated in FIG. 4), the location aware application may be a map application and display the infer position along with the error radius on a user interface. It will be understood that numerous other types of applications make use of inferred positions, and the technology discussed herein is not limited to location aware applications which are mapping applications.

Figure 13:
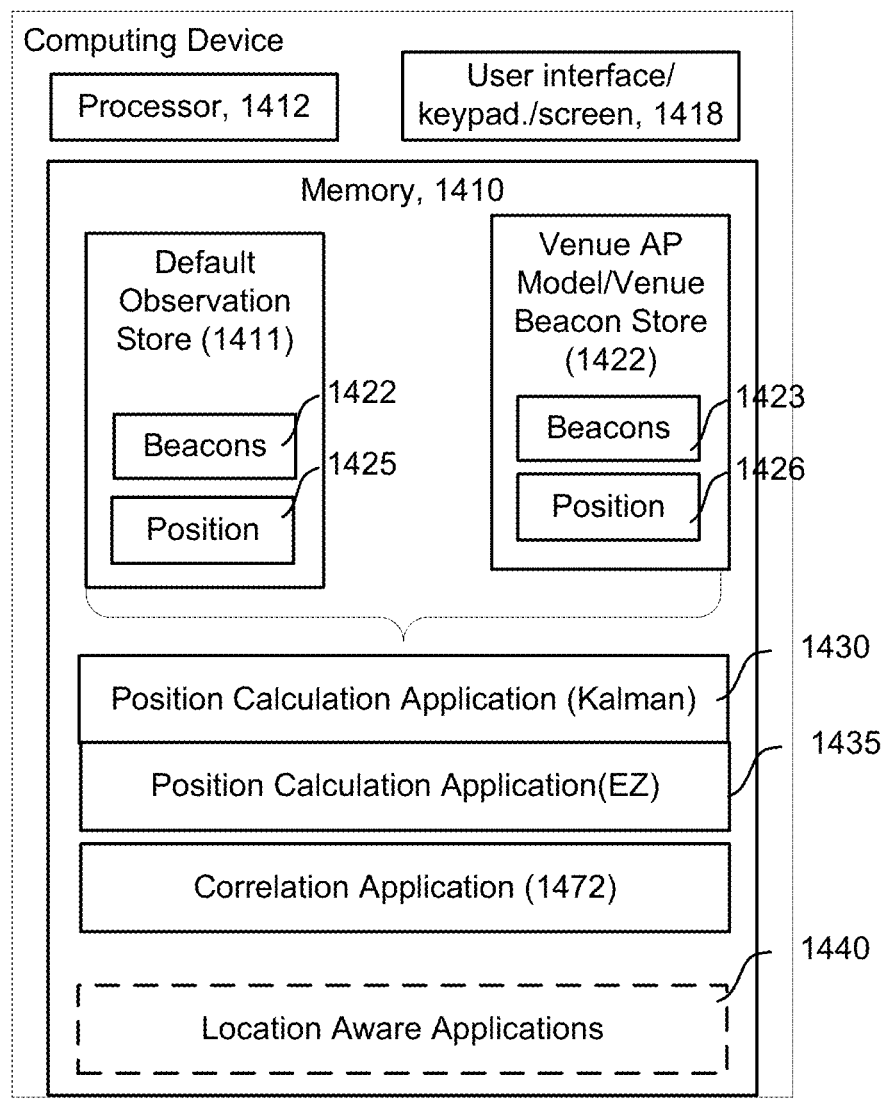
FIG. 13 is a block diagram of a functional representation of a second processing device and a computing device.

FIG. 13 illustrates a block diagram of the functional components of a computing device 1400 which in one embodiment may be utilized to provide location service 125. Computing device 1400 includes a processor 1412 and user interface 1418. Device 1400 may further include memory 1410 having components provided therein including a default beacon store 1411 and a venue/AP beacon store 1422. The default beacon store 1411 may include 2D observations used for default algorithm processing (step 360A), while the venue beacon store 1422 may include data for the EZ and indoor inference methods described above. Memory 1410 may further include position calculation applications 1430, 1435 and correlation application 1472. Optionally, location aware applications 1478 such as those used on the mobile processing device may also be present in memory 1410.

Figure 14:
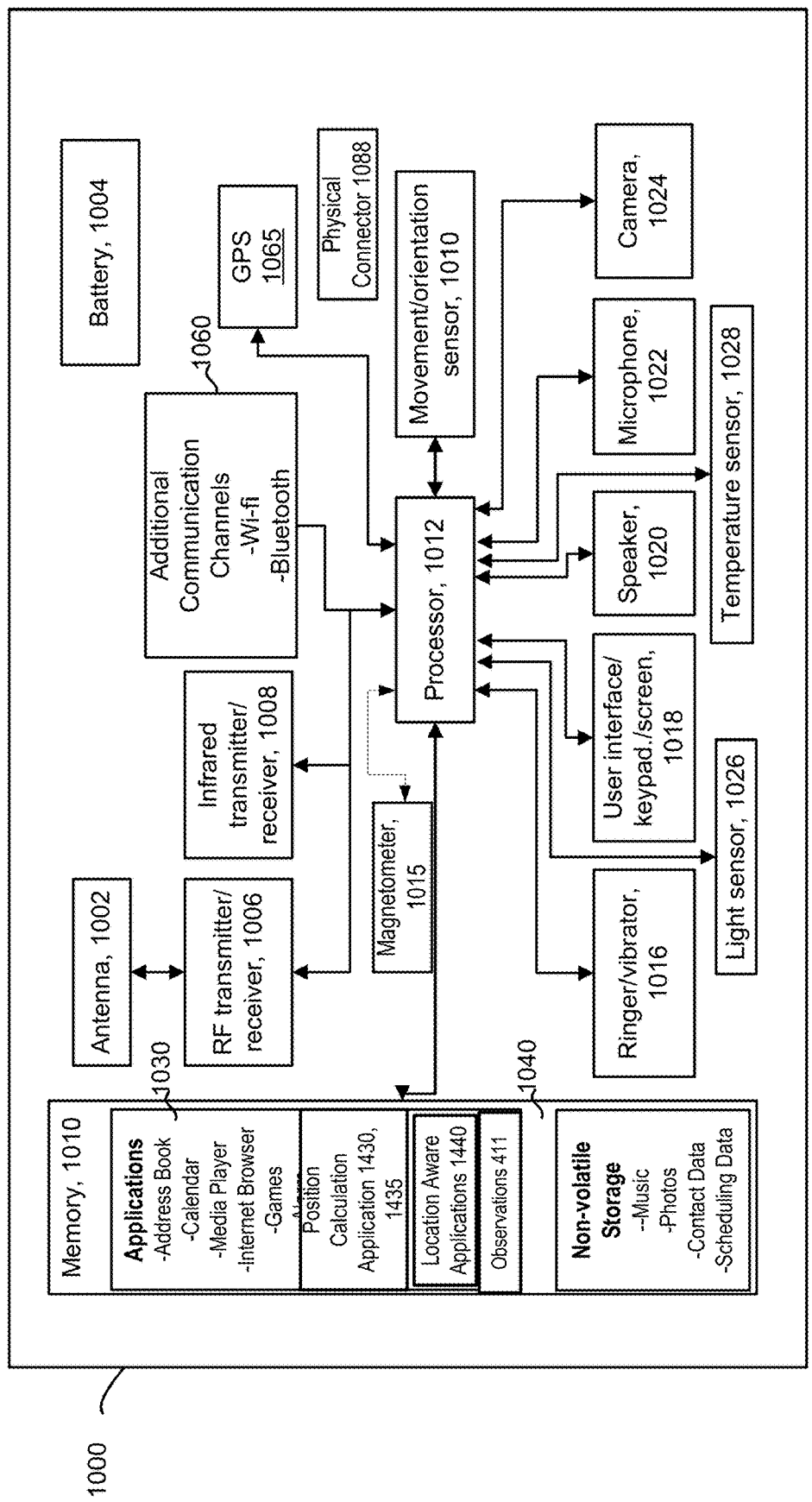
FIG. 14 is a block diagram of a processing system.

FIG. 14 depicts an example block diagram of a mobile device for implementing the operations of the disclosed technology. The device of FIG. 14 is a more detailed illustration of, for example, devices 102, 104 of FIG. 1. Exemplary electronic circuitry of a typical mobile processing device is depicted. The mobile device 1000 includes one or more microprocessors 1012, and memory 1010 (e.g., non-volatile memory such as ROM and volatile memory such as RAM) which stores processor-readable code which is executed by one or more processors of the control processor 1012 to implement the functionality described herein.

Mobile device 1000 may include, for example, processors 1012, memory 1010 including applications and non-volatile storage. The processor 1012 can implement communications, as well any number of applications, including the applications discussed herein. Memory 1010 can be any variety of memory storage media types, including non-volatile and volatile memory. A device operating system handles the different operations of the mobile device 1000 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, an alarm application or other third party applications. The non-volatile storage component 1040 in memory 1010 contains data such as web caches, music, photos, contact data, scheduling data, and other files.

The processor 1012 also communicates with RF transmit/receive circuitry 1006 which in turn is coupled to an antenna 1002, with an infrared transmitted/receiver 1008, and with a movement/orientation sensor 1014 such as an accelerometer and a magnetometer 1015. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1012 further communicates with a ringer/vibrator 1016, a user interface keypad/screen 1018, a speaker 1020, a microphone 1022, a camera 1024, a light sensor 1026 and a temperature sensor 1028. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1012 controls transmission and reception of wireless signals. During a transmission mode, the processor 1012 provides a voice signal from microphone 1022, or other data signal, to the transmit/receive circuitry 1006. The transmit/receive circuitry 1006 transmits the signal to a remote station (e.g., a fixed station, operator, other cellular phones, etc.) for communication through the antenna 1002. The ringer/vibrator 1016 is used to signal an incoming call, text message, calendar reminder, alarm clock reminder, or other notification to the user. During a receiving mode, the transmit/receive circuitry 1006 receives a voice or other data signal from a remote station through the antenna 1002. A received voice signal is provided to the speaker 1020 while other received data signals are also processed appropriately.

Additionally, a physical connector 1088 can be used to connect the mobile device 100 to an external power source, such as an AC adapter or powered docking station. The physical connector 1088 can also be used as a data connection to a computing device. The data connection allows for operations such as synchronizing mobile device data with the computing data on another device. A global positioning service (GPS) receiver 1065 utilizing satellite-based radio navigation to relay the position of the user applications is enabled for such service.

The technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile processing device comprising:
   at least one processor; and
   at least one memory comprising computer program code, the at least one memory and the computer program code configured to, with the at least one processor, cause the at least one processor to:
   observe a plurality of wireless beacons via a wireless communication channel, each beacon having observed characteristics;
   select a first position calculation method stored in the memory based on a sufficient availability of three-dimensional (3D) Wi-Fi fingerprint data comprising at least one of a successful venue detection of a threshold number of previously observed beacons or a successful floor detection of the threshold number of previously observed beacons, wherein the threshold number comprises at least two previously observed beacons;
   select a second position calculation method stored in the memory based on an insufficient availability of Wi-Fi fingerprint data comprising the successful venue detection or the successful floor detection of less than the threshold number of previously observed beacons; and
   calculate a position of the mobile processing device using the selected position calculation method and the observed characteristics of the observed plurality of wireless beacons.

2. The mobile processing device of claim 1, wherein calculating the position of the mobile processing device comprises using an access point (AP) model in a 3D data store having latitude, longitude, venue and venue floor characteristics for a 3D venue.

3. The mobile processing device of claim 2, wherein the AP model comprises a 3D venue-based hybrid AP model.

4. The mobile processing device of claim 1, wherein the first position calculation method comprises an EZ positioning algorithm and the second method position calculation comprises a Kalman algorithm, the first and second position calculation methods using data including 3D floor and venue data.

5. The mobile processing device of claim 1, wherein the computer program code is further configured to, with the at least one processor, cause the at least one processor to select a third method upon failure of calculating the position of the mobile processing device using the first or the second methods or upon Wi-Fi fingerprint data for the observed beacons being unavailable.

6. The mobile processing device of claim 1, wherein the computer program code is further configured to, with the at least one processor, cause the at least one processor to calculate the position of the mobile processing device using a data model including the observed characteristics and associated position data, the position data including a venue identifier and a floor identifier.

7. The mobile processing device of claim 1, wherein the 3D Wi-Fi fingerprint data comprises data relating to a venue where access to Global Positioning System (GPS) data is not readily available, including one of a shopping mall, a school, an office building or an airport terminal.

8. An apparatus comprising:
at least one processor; and
at least one memory comprising computer program code, the at least one memory and the computer program code configured to, with the at least one processor, cause the at least one processor to:
observe a plurality of wireless beacons via a wireless communication channel, each beacon having observed characteristics;
select between a first position calculation method stored in the memory and a second position calculation method stored in the memory based on which of the first position calculation method or the second position calculation method provides a more accurate position calculation using Wi-Fi fingerprint data, the first position calculation method and the second position calculation method corresponding to different positioning algorithms having associated data sources and models; and
calculate a position of the mobile processing device using the selected position calculation method and the observed characteristics of the observed plurality of wireless beacons.

9. The apparatus of claim 8, wherein the computer program code is further configured to, with the at least one processor, cause the at least one processor to determine an amount of available Wi-Fi fingerprint data for previously observed beacons to select the first position calculation method or the second position calculation method as having the more accurate position calculation.

10. The apparatus of claim 9, wherein the available W-fi fingerprint data comprises at least one of a successful venue detection of a threshold of previously observed beacons or a successful floor detection of the threshold previously observed beacons, wherein the threshold comprises at least two previously observed beacons.

11. The apparatus of claim 8, wherein the computer program code is further configured to, with the at least one processor, cause the at least one processor to select the first position calculation method or the second position calculation method based upon at least one of processing capabilities of the at least one processor, a number of observed beacons and an availability of data to resolve a position at a venue.

12. The apparatus of claim 11, wherein the venue comprises a three-dimensional (3D) venue being a venue where access to Global Positioning System (GPS) data is not readily available, including one of a shopping mall, a school, an office building or an airport terminal, and the apparatus is located within a physical structure of one of the shopping mall, the school, the office building or the airport terminal.

13. A computer implemented method to determine a position of a mobile processing device, comprising:
receiving a request to determine a position of a mobile processing device;
selecting one of a first position calculation method or a second position calculation method based on an amount of available Wi-Fi fingerprint data comprising previously observed venue and floor data for observed beacons, the first position calculation method and the second position calculation method corresponding to different positioning algorithms having associated data sources and models; and
calculating the position of the mobile processing device using the selected method.

14. The computer implemented method of claim 13, wherein the Wi-Fi fingerprint data comprises three-dimensional (3D) Wi-Fi access point (AP) fingerprint data.

15. The computer implemented method of claim 14, wherein the 3D Wi-Fi AP fingerprint data comprises data relating to a venue where access to Global Positioning System (GPS) data is not readily available, including one of a shopping mall, a school, an office building or an airport terminal, and the mobile processing device is located within a physical structure of one of the shopping mall, the school, the office building or the airport terminal.

16. The computer implemented method of claim 13, wherein the Wi-Fi fingerprint data comprises at least one of a successful venue detection of a threshold number of previously observed beacons or a successful floor detection of the threshold number of previously observed beacons, the threshold number being at least two.

17. The computer implemented method of claim 13, wherein the first position calculation method comprises an EZ positioning algorithm and the second position calculation method comprises a Kalman algorithm, the first and second position calculation methods using data including three-dimensional (3D) floor and venue data.

18. The computer implemented method of claim 13, further comprising creating a data model including observed beacon characteristics and associated position data, the associated position data including a venue identifier and a floor identifier, and refining previously observed position data to include at least refined position data.

19. The computer implemented method of claim 13, wherein calculating the position of the mobile processing device comprises calculating the position of the mobile processing device in a three-dimensional (3D) venue, wherein selecting one of the first position calculation method or the second position calculation method comprises determining the 3D venue from the observed beacons, followed by determining a floor within the 3D venue from the observed beacons.

20. The computer implemented method of claim 13, further comprising selecting a third position calculation method if no Wi-Fi fingerprint data fingerprint data for observed beacons is available or calculating using the first position calculation method or the second position calculation method fails.

* * * * *